US009891037B2

(12) United States Patent
Singh et al.

(10) Patent No.: US 9,891,037 B2
(45) Date of Patent: Feb. 13, 2018

(54) TIP CLEARANCE MEASUREMENT SYSTEM

(71) Applicant: Hamilton Sundstrand Corporation, Charlotte, NC (US)

(72) Inventors: Bhupindar Singh, West Hartford, CT (US); Gary M. McBrien, South Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/588,125

(22) Filed: May 5, 2017

(65) Prior Publication Data
US 2017/0241762 A1 Aug. 24, 2017

Related U.S. Application Data

(63) Continuation of application No. 14/185,061, filed on Feb. 20, 2014, now Pat. No. 9,677,868.

(60) Provisional application No. 61/888,961, filed on Oct. 9, 2013.

(51) Int. Cl.
*G01B 7/14* (2006.01)
*G01M 15/14* (2006.01)

(52) U.S. Cl.
CPC .............. *G01B 7/14* (2013.01); *G01M 15/14* (2013.01)

(58) Field of Classification Search
CPC .................................. G01B 7/14; G01M 15/14
See application file for complete search history.

(56) References Cited

U.S. PATENT DOCUMENTS

| 5,818,242 | A | 10/1998 | Grzybowski et al. |
| 6,717,418 | B2 | 4/2004 | Orenstein |
| 6,949,939 | B2 | 9/2005 | Kirzhner |
| 7,455,495 | B2 | 11/2008 | Leogrande et al. |
| 7,483,800 | B2 | 1/2009 | Geisheimer et al. |
| 7,607,413 | B2 | 10/2009 | Bamber et al. |
| 7,831,406 | B2 | 11/2010 | Billington et al. |
| 8,164,761 | B2 | 4/2012 | Kominsky |
| 8,230,726 | B2 | 7/2012 | Hafner |
| 2006/0132147 | A1* | 6/2006 | Balasubramaniam ... G01B 7/14 324/662 |

(Continued)

OTHER PUBLICATIONS

The European Search Report dated Mar. 19, 2015 for European Application No. 14188185.4.

*Primary Examiner* — Jermele M Hollington
*Assistant Examiner* — Feba Pothen
(74) *Attorney, Agent, or Firm* — Kinney & Lange, P.A.

(57) ABSTRACT

A tip clearance measurement system (TCMS) includes a probe and sensing circuitry. The probe directs microwave signals toward a turbine blade and receives microwave signals reflected by the turbine blade. The sensing circuitry includes a switch having a first state in which a main frequency is provided at an output of the switch and a second state in which a reference frequency is provided at an output of the switch. The sensing circuitry further includes a first conditioning circuit that receives a frequency provided at the output of the switch and provides a conditioned frequency to the probe and a second conditioning circuit that receives both the conditioned frequency provided by the first conditioning circuit and a reflected frequency received by the probe, and provides a conditioned output based on the conditioned frequency and reflected frequency.

8 Claims, 2 Drawing Sheets

(56) References Cited

U.S. PATENT DOCUMENTS

| | | |
|---|---|---|
| 2007/0043497 A1* | 2/2007 | Leogrande .............. F01D 11/24 |
| | | 701/100 |
| 2007/0128016 A1* | 6/2007 | Dasgupta ................ F01D 11/20 |
| | | 415/14 |
| 2007/0222459 A1 | 9/2007 | Andarawis et al. |
| 2008/0061804 A1 | 3/2008 | Rezvani |
| 2009/0294670 A1 | 12/2009 | Tsuji |
| 2010/0066387 A1 | 3/2010 | Bosselmann et al. |
| 2011/0194122 A1 | 8/2011 | Heyworth et al. |
| 2012/0032689 A1 | 2/2012 | Phillips et al. |
| 2012/0210694 A1 | 8/2012 | Holmquist |
| 2013/0068024 A1 | 3/2013 | Xu et al. |

\* cited by examiner

TIP CLEARANCE MEASUREMENT SYSTEM

CROSS-REFERENCE TO RELATED APPLICATION(S)

This application is a continuation of U.S. application Ser. No. 14/185,061, entitled "TIP CLEARANCE MEASUREMENT SYSTEM" and filed on Feb. 20, 2014 which in turn claims the benefit of U.S. Provisional Application No. 61/888,961 filed Oct. 9, 2013 for "TIP CLEARANCE MEASUREMENT SYSTEM" by Bhupindar Singh and Gary M. McBrien.

BACKGROUND

The present invention is related to tip clearance measurement systems, and in particular to radio frequency circuitry employed in tip clearance measurement systems.

Tip clearance measurement systems are utilized to measure the turbine blade tip clearance in aircraft engines. Tip clearance refers to a distance between rotating components (such as turbine and/or compressor blades) and stationary components (such as a turbine case). Efficiency of aircraft engines is increased by minimizing the distance between these rotating and stationary components. In some cases, the distance can be controlled by selectively heating/cooling the stationary case. The case is expanded/contracted based on the heating/cooling provided, and the distance is minimized.

Tip clearance measurement systems provide feedback regarding the distance between rotating and stationary components. A typical tip clearance measurement system uses a probe to direct electromagnetic (EM) waves toward the turbine blade. In addition, the probe monitors the reflection of the EM waves (as they reflect off of the turbine blades) and uses the monitored reflections to determine the distance between the blade tips and the stationary case. The EM waves are generated at specific frequencies (e.g., microwave, radio frequencies). At least two difference frequencies are required, including a reference frequency and a main frequency. Typically, separate circuits are required to condition and provide each of these frequencies to the probe. In addition, separate circuits are required for each frequency to analyze the reflected signals received from the probe.

SUMMARY

A tip clearance measurement system (TCMS) includes a probe and sensing circuitry. The probe directs microwave signals toward a turbine blade and receives microwave signals reflected by the turbine blade. The sensing circuitry includes a switch having a first state in which a main frequency is provided at an output of the switch and a second state in which a reference frequency is provided at an output of the switch. The sensing circuitry further includes a first conditioning circuit that receives a frequency provided at the output of the switch and provides a conditioned frequency to the probe and a second conditioning circuit that receives both the conditioned frequency provided by the first conditioning circuit and a reflected frequency received by the probe, and provides a conditioned output based on the conditioned frequency and reflected frequency.

DETAILED DESCRIPTION

Figure 1:
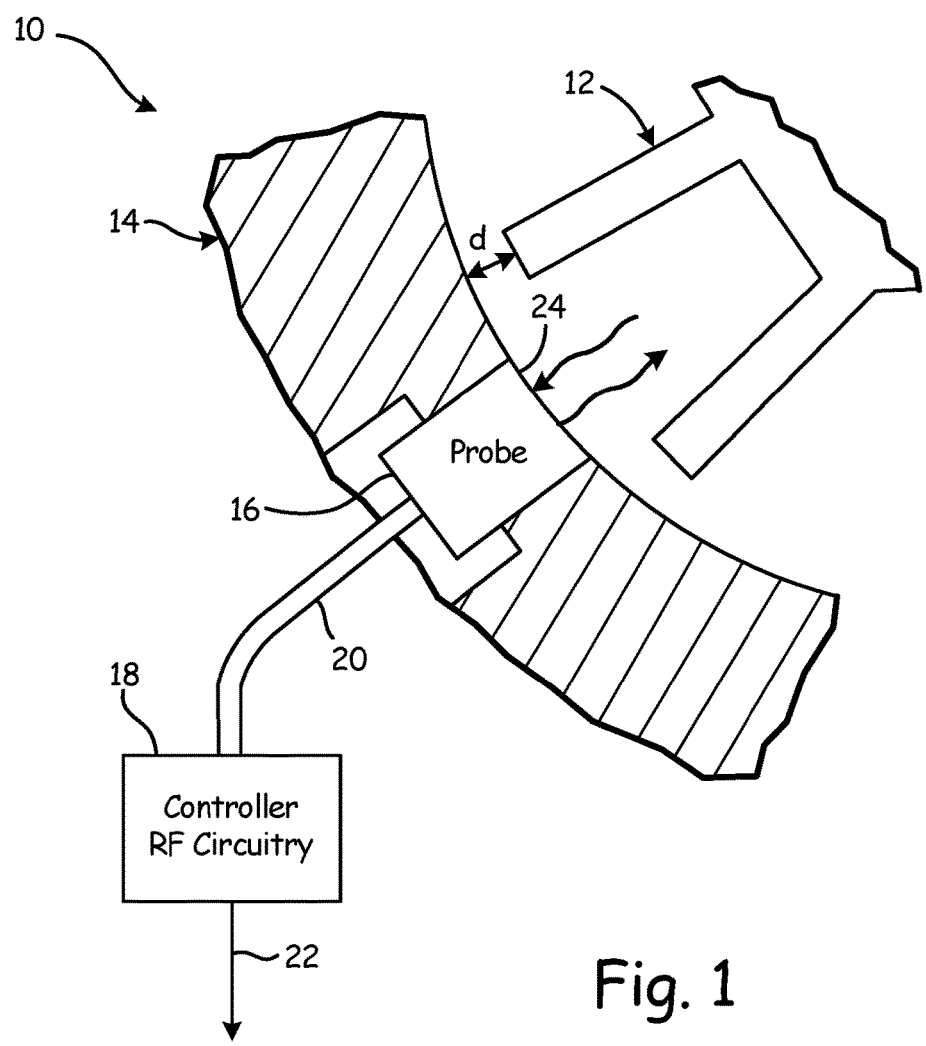
FIG. 1 is a schematic of a tip clearance measurement system according to an embodiment of the present invention.

FIG. 1 is a schematic of a tip clearance measurement system employed on a turbine system. In particular, FIG. 1 illustrates rotor 10, having a plurality of blades 12 extending toward stationary case 14. It is beneficial for engine efficiency for the distance between the tips of blades 12 and stationary case 14 to be minimized. The distance 'd' can be controlled, but to control properly requires feedback regarding the distance between blade tips 12 and stationary case 14. This information is provided by the tip clearance measuring system. The tip clearance measurement system may be utilized in a variety of turbine application, such as gas turbine engines, steam turbines, or other well-known applications utilizing a turbine assembly.

The tip clearance measurement system includes probe 16 and controller/radio frequency (RF) circuitry 18. Although circuitry 18 is described as RF circuitry 18, the frequency of signals provided by circuitry 18 are not limited to the radio frequency range. For example, the signals may be in the microwave range (e.g., microwave signals). The term 'RF' is used to generically describe circuitry capable of generating and analyzing signals defined by a characteristic frequency.

Probe 16 is positioned within stationary case 14, and is oriented to direct signals (e.g., microwave or radio frequency) towards turbine blades 12. In addition, probe 16 receives reflected signals. Controller/RF circuitry 18 generates the signals that are provided to probe 16 and processes the reflected signals sensed by probe 16. Coaxial cable 20 communicates signals bi-directionally between probe 16 and controller/RF circuitry 18, including the signals to be directed towards turbine blades 12 and the reflected signals received by probe 16. A benefit of the present invention is that only a single coaxial cable is required to communicate signals being provided to probe 16 and reflected signals received from probe 16. This provides a significant weight savings over traditional systems. In applications, such as aerospace applications, weight is a significant factor in operational cost. Controller/RF circuitry 18 provides an output via output line 22 that represents conditioned/filtered signals received from probe 16 that can be used to calculate the distance 'd' between the turbine blade 12 and stationary case 14.

In one embodiment, the distance 'd' is measured by applying a microwave signal at a first frequency and measuring the resulting signal reflection. Subsequently, another microwave signal is applied at a second frequency and the resulting signal reflection is measured. The measured signal reflections are compared to one another to determine the distance 'd' between turbine blades 12 and stationary case 14. One of the microwave signals is designated the reference frequency, and is selected based on the RF circuitry 18, the length of coaxial cable 20 and the position of probe 16 (which together can be described as the waveguide) such that the signal terminates at surface 24 of probe 16. As a result of the waveform terminating at surface 24, most of the signal associated with the reference frequency is reflected back from surface 24.

At another time, either before or after the reference frequency is applied, a main frequency is provided by controller/RF circuitry 18 to probe 16. The main frequency is provided to probe 16 via the same coaxial cable 20, such that the waveguide (defined by RF circuitry 18, coaxial cable 20, and probe 16) provided for the main frequency is identical to the waveguide provided for the reference frequency. However, the frequency of the main frequency is selected so that it is not reflected (substantially) at surface 24 of probe 16, but rather, is directed toward turbine blades 12. The main frequency is reflected by turbine blade 12, and the reflected signal is received by probe 16. To allow measurement of the distance 'd', the wavelength of the main frequency must be at least twice as long as the distance 'd'. If the distance 'd' is longer than the wavelength, then it cannot be determined from the reflection if the distance is a multiple of the wavelength.

The distance 'd' is thus measured by applying the main frequency and monitoring the resulting reflection. Subsequently, the reference frequency is applied and the resulting reflection is monitored. The monitored reflected signal provides an indication of distance traveled. Knowledge of location of surface 24 of probe 16, combined with a comparison of the reflected signals allows the distance 'd' to be determined. A benefit of the present invention is that because the main frequency and the reference frequency are applied at different times, the same waveguide (e.g., RF circuitry 18, the length of coaxial cable 20 and the position of probe 16) can be used for both signals. As described above, a benefit of this approach is that a single coaxial cable can be used to carry both the reference frequency and the main frequency. This provides significant weight savings over typical systems in which at least two coaxial cables are required to simultaneously communicate the reference frequency and the main frequency to the probe and receive reflected signals back from the probe. In addition, utilizing the same waveguide automatically removes errors that would otherwise exist between a pair of waveguides.

Figure 2:
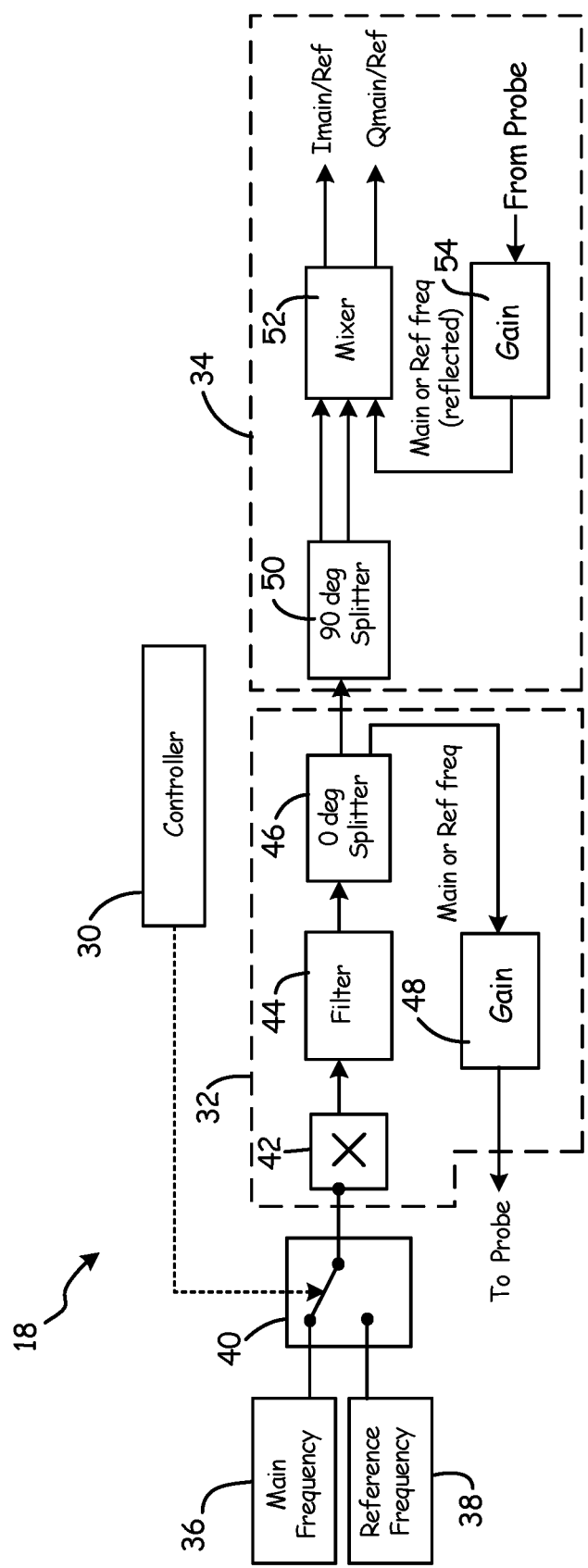
FIG. 2 is a block diagram of a controller/electromagnetic (EM) circuitry employed to condition the EM signals provided to the probe and to analyze reflected EM signals received by the probe.

FIG. 2 is a block diagram of controller/radio frequency (RF) circuitry 18 employed to generate frequency signals provided to the probe and to analyze reflected signals received by the probe. In particular, controller/RF circuitry 18 includes controller 30, first RF conditioning circuitry 32, second RF conditioning circuit 34, main frequency generator 36, reference frequency generator 38, and switch device 40. First RF conditioning circuitry 32 includes multiplier circuit 42, filter circuit 44, splitter circuit 46, and gain circuit 48. Second RF conditioning circuit 34 includes ninety-degree splitter circuit 50, mixer circuit 52, and gain circuit 54.

To generate a signal at the main frequency, controller 30 controls switch device 40 to apply main excitation frequency 36 to first RF conditioning circuitry 32. Multiplier circuit 42 multiplies the main excitation frequency signal by an integer value (e.g., four). The multiplied signal is filtered by filter circuit 44, which in one embodiment is a band-pass filter designed to pass a particular range of frequencies, and filter all others. Splitter circuit 46 splits the filtered signal into a first and second signal. In the embodiment shown in FIG. 2, splitter circuit 46 is a zero degree splitter, which results in no phase difference between the split signals (i.e., split signals are substantially identical). One of the split signals is provided to second conditioning circuit 34 for use in retrieving the reflected signals. The other split signal is provided to gain circuit 48, which amplifies the signal and provides the conditioned main frequency signal to probe 16 (shown in FIG. 1).

To generate a signal at the reference frequency, controller 30 controls switch device 40 to apply reference excitation frequency 38 to first RF conditioning circuitry 32. The reference frequency 38 is conditioned in the same way, by the same components as main frequency 36. A benefit of the embodiment shown in FIG. 2, is both the main frequency and the reference frequency are conditioned by the same circuitry, rather than separate circuits that each contribute variations that lead to errors. In addition, utilizing the same circuitry reduces the weight, cost and power associated with RF circuitry.

Reflected signals received from probe 16 are provided to second RF conditioning circuit 34. Once again, both the reflected main frequency and reflected reference frequency are processed by the same circuitry (i.e., second conditioning circuitry 34). Gain circuit 54 amplifies reflected signals received from probe 54. The amplified signals are then provided to mixer circuit 52. In addition, second RF circuitry 34 includes ninety-degree splitter circuit 50, which splits the microwave signal provided by splitter circuit 46 into sine and cosine components (e.g., separate in phase by ninety degrees). The sine and cosine components provided by splitter circuit 46 represent the frequency and phase of the microwave signal (either reference frequency or main frequency) provided to probe 16. The sine and cosine components are provided to mixer circuit 52, which compares the reflected signal to both the sine and cosine component to determine the phase of the reflected signal. The resultant outputs of mixer circuit 52 (e.g., IMain/Ref and QMain/Ref) indicate how closely aligned or in-phase the reflected signal is with the signal provided to probe 16. In the embodiment shown in FIG. 2, the phase of the reflected signal is provided in the I-Q rotating reference frame. In other embodiments, the output of mixer circuit 52 may be converted or expressed in other well-understood reference frames.

For example, if a reference frequency is applied to probe 16, and the resulting reference frequency reflection is largely in-phase with the reference signal, then the IRef signal will be greater than the QRef signal. Likewise, if a main frequency is applied to probe 16, and the resulting main frequency reflection is largely in-phase with the main signal, then the Imain signal will be greater than the Qmain signal. Once again, a benefit of the embodiment shown in FIG. 2, is both the main frequency reflections and the reference frequency reflections are conditioned by the same circuitry, rather than separate circuits that each contribute variations that lead to errors. In addition, utilizing the same circuitry reduces the weight, cost and power associated with RF circuitry.

In one embodiment, the outputs generated by second RF circuitry 34 (e.g., IMain/Ref and QMain/Ref) are provided to controller 30 for storage and subsequent processing to determine distance 'd'. In other embodiments, these outputs may be provided to another processor (not shown) for storage and processing to determine distance 'd'. Because only one of the reference frequency or main frequency is applied at a time, the monitored reflections must be stored. Once both the reference frequency and main frequency have been applied and reflections monitored (in either order), then a comparison of the monitored reflections is used to determine the distance 'd'.

In operation then, controller 30 would at a first time control switch device 40 to apply the main frequency to probe 16 via first RF conditioning circuitry 32. A reflected main frequency received from probe 16 would be analyzed by second RF conditioning circuitry 32 to provide a phase comparison between the main frequency and reflected main frequency. At a subsequent time determined by controller 30, switch device 40 is controlled to apply the reference frequency to probe 16 via first RF conditioning circuitry 32.

A reflected reference frequency received from probe 16 would be analyzed by second RF conditioning circuitry 32 to provide a phase comparison between the reference frequency and the reflected reference frequency. Based on the resulting phase comparisons associated with the main frequency and the reference frequency, a distance 'd' can be calculated either by controller 30 or another processing device.

In this way, the present invention provides a tip clearance measurement system that avoids redundant circuitry to condition and analyze RF signals used to determine tip clearance. In addition, utilizing the same circuitry for both the reference frequency signal and the main frequency signal prevents differences or variations in the redundant circuitry from affecting the monitored reflections.

Discussion of Possible Embodiments

The following are non-exclusive descriptions of possible embodiments of the present invention.

A tip clearance measurement system (TCMS) according to an exemplary embodiment of this disclosure, among other possible things includes a probe and radio frequency (RF) circuitry. The probe both directs signals toward a turbine blade and receives signals reflected by the turbine blade. The RF circuitry includes a switch having a first state in which a main frequency is provided at an output of the switch and a second state in which a reference frequency is provided at an output of the switch. The RF circuitry further includes a first conditioning circuit that receives a frequency provided at the output of the switch and provides a conditioned frequency to the probe and a second conditioning circuit that receives both the conditioned frequency provided by the first conditioning circuit and a reflected frequency received by the probe, and provides a conditioned output based on the conditioned frequency and reflected frequency.

The TCMS of the preceding paragraph can optionally include, additionally and/or alternatively, any one or more of the following features, configurations and/or additional components:

A further embodiment of the foregoing TCMS, which may further include a coaxial cable connected between the probe and the sensing circuitry.

A further embodiment of the foregoing TCMS, which may further include a controller that selectively controls the state of the switch to apply either the main frequency or the reference frequency to the output of the switch.

A further embodiment of the foregoing TCMS, wherein the controller may apply the main frequency to the output of the switch, and then subsequently apply the reference frequency to the output of the switch.

A further embodiment of the foregoing TCMS, wherein the conditioned output provided by the second conditioning circuit may be provided in the I-Q reference frame.

A further embodiment of the foregoing TCMS, wherein the controller may store the conditioned output provided by the second conditioning circuit for both the main and reference frequency reflections.

A further embodiment of the foregoing TCMS, wherein the controller may determine tip clearance based on the stored main and reference frequency reflections.

A method of measuring tip clearance in a turbine includes controlling a switch to a first state to apply a main frequency signal to a probe via a first conditioning circuit, wherein the first conditioning circuit provides a first conditioned signal to a probe. The method further includes maintaining the switch in the first state while a first reflected signal is received by the probe and conditioned by a second conditioning circuit, wherein the second conditioning circuit conditions the first reflected signal based on the first conditioned signal to provide a first output. The method further includes controlling the switch to a second state to apply a reference frequency signal to the first conditioning circuit, wherein the first conditioning circuit provides a second conditioned signal to the probe. The method further includes maintaining the switch in the second state while a second reflected signal is received by the probe and conditioned by the second conditioning circuit, wherein the second conditioning circuit conditions the second reflected signal based on the second conditioned signal to provide a second output. Tip clearance is calculated based on the first output and the second output.

A further embodiment of the foregoing method, which may further include controlling an amount of time between controlling the switch to the first state and controlling the switch to the second state.

A turbine system according to an exemplary embodiment of this disclosure, among other possible things includes a plurality of turbine blades extending radially outward from a rotor, a stationary case surrounding the plurality of turbine blades, and a tip clearance measurement system (TCMS). The TCMS system includes a probe located within the stationary case and oriented to direct signals toward the plurality of turbine blades and receive signals reflected by the plurality of turbine blades. The TCMS system further includes RF circuitry that includes a switch having a first state in which a main frequency is provided at an output of the switch and a second state in which a reference frequency is provided at an output of the switch, a first conditioning circuit that receives a frequency provided at the output of the switch and provides a conditioned frequency to the probe; and a second conditioning circuit that receives both the conditioned frequency provided by the first conditioning circuit and a reflected frequency received by the probe, and provides a conditioned output based on the conditioned frequency and reflected frequency.

A further embodiment of any of the foregoing turbine systems, which may further include a coaxial cable connected between the probe and the sensing circuitry.

A further embodiment of any of the foregoing turbine systems, which may further include a controller that selectively controls the state of the switch to apply either the main frequency or the reference frequency to the output of the switch.

A further embodiment of any of the foregoing turbines, wherein the controller may apply the main frequency to the output of the switch, and then subsequently apply the reference frequency to the output of the switch.

A further embodiment of any of the foregoing turbines, wherein the controller may store the conditioned output provided by the second conditioning circuit for both the main and reference frequency reflections A further embodiment of any of the foregoing turbines, wherein the controller determines tip clearance based on the stored conditioned outputs provided by the second conditioning circuit.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of measuring tip clearance in a turbine, the method comprising:
controlling a switch to a first state to apply a main frequency signal to a probe via a first conditioning circuit, wherein the first conditioning circuit provides a first conditioned signal to a probe;
maintaining the switch in the first state while a first reflected signal is received by the probe and conditioned by a second conditioning circuit, wherein the second conditioning circuit conditions the first reflected signal based on the first conditioned signal to provide a first output;
controlling the switch to a second state to apply a reference frequency signal to the first conditioning circuit, wherein the first conditioning circuit provides a second conditioned signal to the probe;
maintaining the switch in the second state while a second reflected signal is received by the probe and conditioned by the second conditioning circuit, wherein the second conditioning circuit conditions the second reflected signal based on the second conditioned signal to provide a second output; and
calculating tip clearance based on the first output and the second output.

2. The method of claim 1, further comprising:
controlling an amount of time between controlling the switch to the first state and controlling the switch to the second state.

3. The method of claim 1,
wherein the first conditioning circuit provides both the first and second conditioned signals to the probe via a coaxial cable.

4. The method of claim 1,
wherein controlling the switch to the first state, maintaining the switch in the first state, controlling the switch to a second state, and maintaining the switch in the second state are performed by a controller that selectively controls the switch.

5. The method of claim 1,
wherein controlling a switch to a first state to apply a main frequency signal to a probe is performed prior to controlling the switch to a second state to apply a reference frequency signal to the first conditioning circuit.

6. The method of claim 1,
wherein the second conditioning circuit conditions the first reflected signal based on the first conditioned signal to provide the first output in an I-Q reference frame.

7. The method of claim 1, further comprising:
storing the first output and the second output.

8. The method of claim 1,
wherein calculating the tip clearance based on the first output and the second output comprises comparing the first output and the second output to determine the tip clearance.

* * * * *